United States Patent [19]

Taciuk

[11] 3,746,330
[45] July 17, 1973

[54] DRILL STEM SHOCK ABSORBER

[76] Inventor: William Taciuk, Box 702, Labrador City, Newfoundland, Canada

[22] Filed: Oct. 28, 1971

[21] Appl. No.: 193,391

Related U.S. Application Data

[63] Continuation-in-part of Ser. No. 883,144, Dec. 8, 1969.

[52] U.S. Cl. .............................. 267/137, 64/11 R
[51] Int. Cl. ............................................. F16f 15/10
[58] Field of Search ................... 267/137, 141, 152; 64/11 R

[56] References Cited
UNITED STATES PATENTS
2,846,857   8/1958   Hagenlocker ...................... 64/11 R

*Primary Examiner*—James B. Marbert
*Attorney*—Alan Swabey

[57] ABSTRACT

From a broad aspect, the present invention relates to a shock absorber for connecting a drive shaft with a driven shaft. A drive plate is attached to the drive shaft and a driven plate, axially disposed from the drive plate, is connected to a driven shaft. A washer is axially disposed from the driven plate on the oppsoite side from the drive plate. A first and second resilient means is provided between the driven plate and the drive plate and between the driven plate and the washer, respectively. Pin projections extend from the driven plate into at least one of the first and second resilient means. Fastening means extend between the drive plate and the washer to precompress the first and second resilient means to a predetermined pressure and to cause the resilient to compress against the pin projections extending therein. The fastening means also pass through the plane of the driven plate without connection therewith.

8 Claims, 3 Drawing Figures

INVENTOR
William TACIUK

ATTORNEY

DRILL STEM SHOCK ABSORBER

This is a Continuation-In-Part of application Ser. No. 883,144, filed Dec. 8, 1969, entitled "Drill Stem Shock Absorber."

BACKGROUND OF THE INVENTION

1. Field of Invention

The present invention relates to a shock absorber and more particularly to a torque and pressure transmitting shock absorber specifically adapted for heavy-duty drilling equipment.

2. Description of Prior Art

In drilling operations, the drill bit is forced under high downward pressure against say, a rock formation and is rotated. Preferably the speed of rotation is correlated with the pressure exerted to obtain the optimum advancement of the drill through the material being penetrated. This sometimes requires the application of relatively high downward pressure to the drill as well as relatively high torque.

Under these conditions of torque and high downward pressure it is desirable to couple the drive shaft to the transmission shaft through a shock absorbing coupling in which there is substantially no shear between the drive and driven parts and in which the downward pressure and torque is transmitted through resilient material. Further, during compression under operating conditions none of the parts of the shock absorbing coupling should become loose to cause frictional movement between parts and wear.

As drilling proceeds, the material being penetrated varies due to varying drill hole and rock conditions, thereby imparting different stresses to the drill and setting up vibrations which are transmitted through the drill to the transmission shaft and main frame of the drilling rig. These vibrations, if they are not dampened, may cause excessively high stresses to be developed in the drill components and it is believed it may affect drill penetration rate and overall drill life.

Also, during drilling, there is sometimes a slight misalignment of the transmission shaft with respect to the drill hole. These misalignments further aggravate the situation, reducing not only the efficiency of the drilling operation, but also the rate of penetration and overall drill life.

SUMMARY OF INVENTION

It is thus the main object of the present invention to provide a shock absorber that can transmit the high downward pressure required in the drill bit downwardly into the formation to be drilled, while simultaneously transmitting the high torsional forces required for turning the bit while absorbing the vibrations encountered during drilling operations.

It is a further object of the present invention to provide a shock absorber that can absorb minor variations in alignment of drill hole with transmission shaft.

BRIEF DESCRIPTION OF DRAWINGS

Further features, objects and advantages will be evident from the following detailed description taken in conjunction with the accompanying drawings in which.

DESCRIPTION OF PREFERRED EMBODIMENTS

Figure 1:
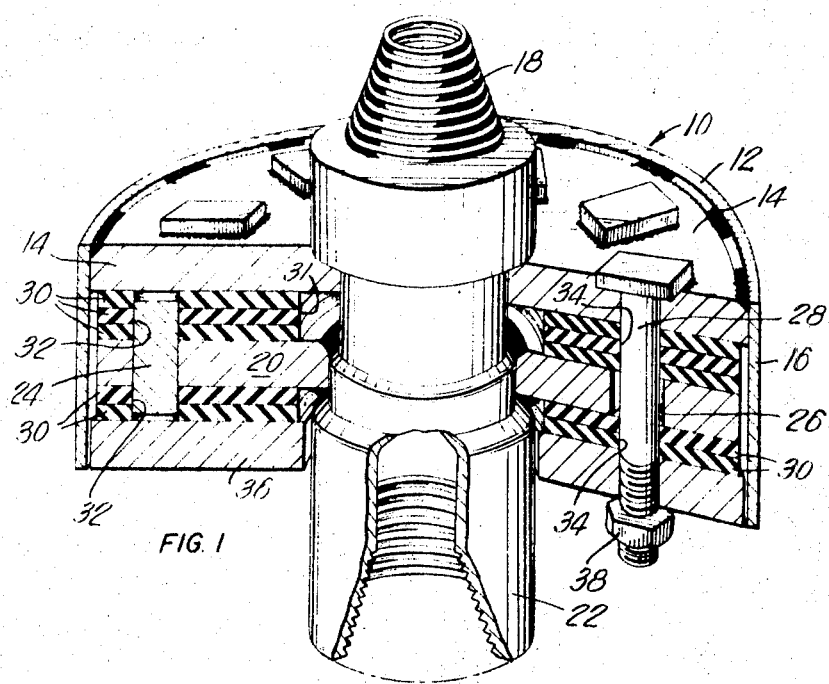
FIG. 1 is an isometric view of the shock absorber of the present invention with parts broken away to illustrate the internal construction of the shock absorber.

As shown, the shock absorber 10 comprises a cup-shaped housing 12 formed with a circular drive plate 14 and a peripheral skirt 16. The drive plate 14 may be connected to a drive shaft of the machine in any suitable manner, for example, by means of connector 18 or the like. The plate 14 extends substantially radially of the connector 18 and thus of the axis of rotation of the housing 12. The skirt 16 functions primarily as a protector to protect the materials within the housing from contact with dust, oil or the like, which are generally present in the area of heavy-duty drilling equipment.

Contained within the housing 12 is a driven plate 20 which is connected to a driven shaft or the like by any suitable connecting means such as the connector 22. The plate 20 is substantially radial of the axis of rotation of the housing 12 and thus the axis of rotation of the connectors 18 and 22 which are normally in alignment with each other. The connector 18 and plate 20 are axially spaced apart to permit relative axial movement therebetween.

The driven plate 20 has a plurality of pins 24 secured thereto and projecting substantially perpendicularly therefrom and from opposite surfaces thereof. These pins 24 are arranged in a circle concentric with the rotational axis of the plate 20 and connector 22 and are spaced apart to accommodate the bolts 28 therebetween, to be described hereinbelow. The pins 24, in the illustrated arrangement, extend substantially parallel to the axis of rotation of the plate 20 and thus parallel to the axis of the shock absorber 10.

The plate 20 on the circle on which the pins 24 are mounted and between adjacent pins 24 is provided with a plurality of holes 26 each adapted to loosely receive a bolt 28 so that the driven plate 20 may vibrate between the resilient means 30 (described below) to dampen shocks transmitted up the drill shaft. Also, these holes 26 permit the driven plate 20 to have a slight angular displacement when the transmission shaft is misaligned with the drive shaft connected to connector 18.

A first group of annular resilient discs 30 of rubber or the like are sandwiched between the plates 20 and 14. These resilient discs 30 are provided with holes 32 and 34 which snugly receive the pins 24 and bolts 28 respectively. A second group of similar annular rubber discs 30 are interposed between the driven plate 20 and an annular rigid washer 36. The pins 24 project substantially in the first and second groups of rubber discs 30 but provide clearance between the ends of the pins and the plate 14 and washer 36 to permit compression of the rubber discs 30 and relative axial movement between the plate 20 and the plate 14 or washer 36. The clearance between the ends of the pins and the plate 14 and washer 36, is such that under maximum downward pressure there is no metal to metal contact. This clearance also permits the driven plate to be slightly angularly displaced during conditions of misalignment and shock absorbing. The bolts 28, on the other hand, project through the disc 14, the first group of rubber discs 30, plate 20, the second group of rubber discs 30 and washer 36 and are fitted with nuts 38 which are tightened to hold the assembly together and precompress the rubber disc thereby preloading the shock absorber.

The first and second groups of rubber discs 30 are precompressed so that they expand laterally causing the rubber to compress against a portion of the surface or top bolts 28 and pins 34 to substantially eliminate any voids and movement between the rubber and these surfaces during transmission of rotational forces (torque) and downward pressure. Thus, there is substantially no shear between the elements of the shock absorber during operation. The precompression force applied to the first and second groups of rubber discs exceeds the maximum downward pressure to be exerted on the drive plate 14 during drilling. Therefore, when downward pressure is applied to the drive plate 14, the first group of rubber discs are further compressed to transmit downward pressure. The second group, although expanding (decompressing) remains under sufficient compression to maintain the washer under pressure against the nuts 38 of bolt 28 thereby preventing the washer from becoming loose and vibrating to wear parts of the absorber. If an overload in the downward pressure occurs the rubber discs 30 would expand in the space between the outer periphery of the discs 30 and the inner surface of the skirt 16. Also, since the central apertures 31 in the discs 30 are larger than connectors 18 and 22 to provide clearance between the discs 30 and the connectors 18 and 22, the discs 30 would also further expand in this area to compensate for overload pressure.

Figure 2:
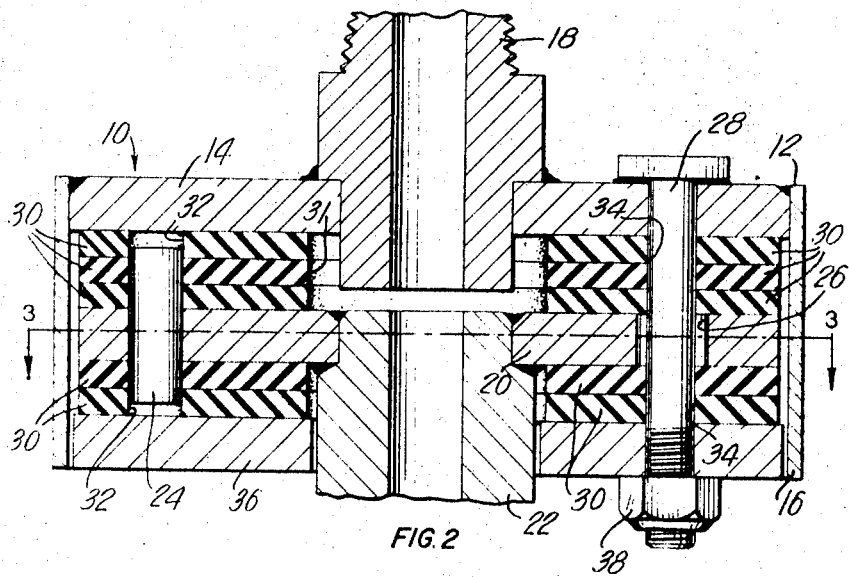
FIG. 2 is a diagonal section through the shock absorber.
Figure 3:
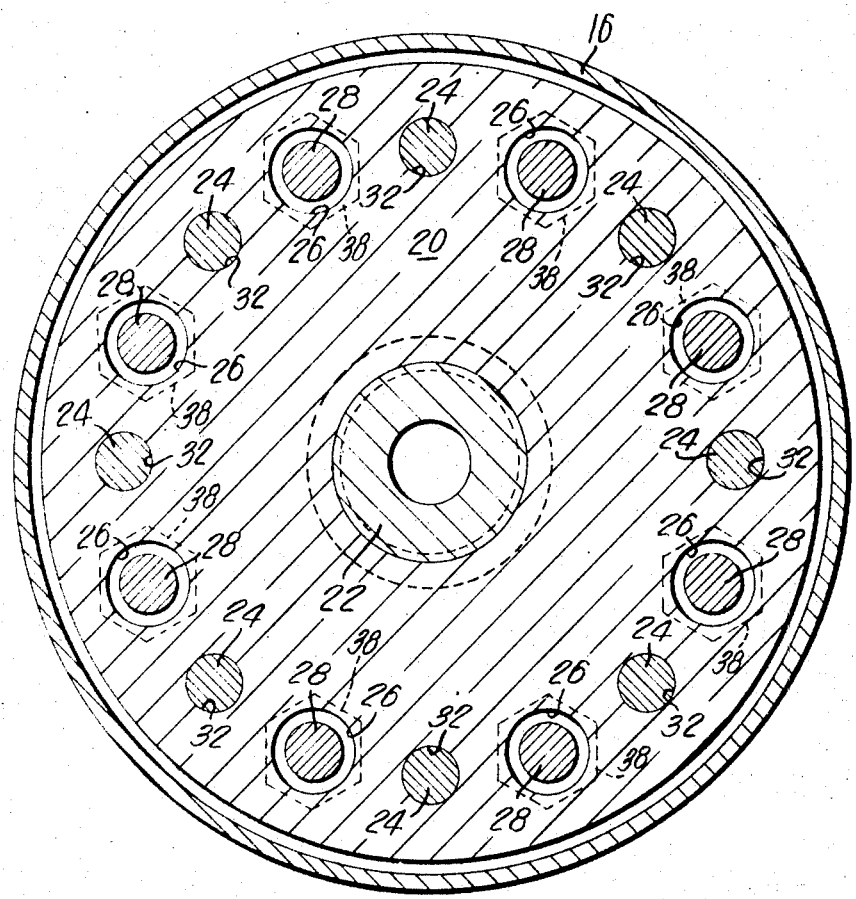
FIG. 3 is a sectional view along the lines 3—3 of FIG. 2.

As can be seen from FIG. 2, an air passage 39 extends through the center of the connectors 18 and 22 for the removal of drill cuttings from the drill hole (not shown). The central aperaturs 31 of the discs 30 between the drive plate 14 and the driven plate 20, together with the ends of the couplings 18 and 22 to which the plates are attached respectively, cooperate during compression of the discs 30 to form a sealed interior between the ends of the couplings for communication of the interior of one coupling with the interior of the other.

The total number of rubber discs 30 may be varied, particularly the number between the plate 20 and plate 14, to obtain the desired characteristics in the shock absorber, i.e., the more discs, the more flexibility theoretically possible. Also, the discs 30 may be replaced by unitary blocks of rubber of the like resilient material both between the plates 14 and 20 and the plate 20 and washer 36.

In operation, the nuts 38 are tightened to apply the desired precompression to the resilient means in the shock absorber 10. Torque and downward pressure are applied to the plate 14 and housing 12 via the connector 18 and this torque and downward pressure is transmitted to the coupling 22 in the following way. The downward pressure is transmitted via the connector 18, the drive plate 14, the first group of rubber discs 30 by compression thereof, the driven plate 20 and the connector 22 which is connected to the drill shaft (not shown) forcing the drill bit (not shown) or the like into the drill hole. Torque (rotational force) is transmitted to the plate 20 from the plate 14 via the bolts 28, the compressed rubber discs 30 between the bolts and the pins 24 and to the driven plate 20 via the pins 24 and thereafter to the drill shaft (not shown) connected to connector 22. Torque is also transmitted by the direct contact of the rubber under compression between the plates 20 and 14. With this arrangement there is substantially no shear between the interconnecting parts, thus greatly reducing wear and prolonging the life of the absorber.

It is readily apparent that the present invention provides a completely floating joint between the coupling 18 and coupling 22. It has been found that vertical motions of plus or minus about an inch and a half, rotational motions of plus or minus one-half to one inch, and misalignment of plus or minus about one-half inch are easily obtainable and the machine can be designed to provide even more flexibility. By varying the rubber composition and dimensions of the resilient blocks, almost any range of sensitivity can be obtained. One of the key factors in designing the shock absorber of the present invention is the ratio of the area of the resilient discs to its thickness. By changing this ratio, the characteristics of the absorber can be revised. The characteristics of the absorber are also changed if the discs 30 are expanded into contact with the skirt 16. Generally, the area of the resilient discs will be sufficient to limit the unit pressure to less than about the deterioration pressure of the resilient material, i.e., 300 p.s.i. and preferably less than about 200 p.s.i. under full load for rubber. Similarly, the size of the pins 24 and bolts 38 together with the torque applied determine the pressure in the resilient means between the pins 24 and bolts 28.

Even if the rubber discs 30 completely break down, the unit will still stay together and continue working until rebuilt. No safety hazard is involved, i.e., should the rubber discs disintegrate, the bolts 28 would simply contact the sides of the apertures 26 and would directly drive the plate 20. Similarly, the pins 24 would contact the plate 14 to transmit downward pressure.

Modifications to the shock absorber may be made without departing from the scope of the invention as defined in the appended claims.

I claim:

1. A shock absorber for connecting a drive shaft with a driven shaft the combination comprising:
   a drive plate attachable to a drive shaft;
   a driven plate axially disposed from said drive plate attachable to a driven shaft;
   a washer axially disposed from said driven plate on the opposite side from said drive plate;
   first resilient means between said drive plate and said driven plate;
   second resilient means between said driven plate and said washer;
   pin projections extending from said driven plate into at least one of said first and second resilient means; and
   fastening means extending between said drive plate and said washer and through both said first and second resilient means and to cause said resilient means to compress against both said pin projections and said fastening means, said fastening means passing through the plane of said driven plate without connection therewith.

2. A shock absorber as claimed in claim 1 wherein said fastening means are adjustable to precompress said first and second resilient means to a predetermined pressure exceeding the maximum downward pressure applied to said drive plate.

3. A shock absorber as claimed in claim 2 wherein said driven plate and said washer are displaced relative to said drive plate when said drive plate is subjected to downward pressure, said first and second resilient means remaining under compression between said driven plate and drive plate and said driven plate and washer, respectively, during conditions of maximum downward pressure against said drive plate.

4. A shock absorber as in claim 1 wherein said fastening means and said pin projections are disposed in a circular pattern, whereby torque is transmitted from said fastening means to said resilient means and from said resilient means to said pin projections.

5. A shock absorber as in claim 1 wherein said fastening means are bolts, said bolts and said pin projections being aligned in spaced apart relationship in a circle concentric with said drive shaft when said shock absorber is in its unloaded condition.

6. A shock absorber as in claim 1 wherein said first and second resilient means are annular rubber discs lying in face-to-face relationship with each other.

7. A shock absorber as in claim 1 wherein there is further provided an annular skirt projecting from said drive plate to form with said drive plate a cup-shaped housing in which said driven plate, said first and second resilient means and said washer are contained.

8. A shock absorber for connecting a drive shaft with a driven shaft the combination comprising:
a drive plate attachable to a drive shaft;
a driven plate axially disposed from said drive plate attachable to a driven shaft;
a washer axially disposed from said driven plate on the opposite side from said drive plate;
first resilient means between said drive plate and said driven plate;
second resilient means between said driven plate and said washer;
pin projections extending from said driven plate into at least one of said first and second resilient means; and
fastening means extending between said drive plate and said washer, said first resilient means having a hollow center portion, said drive and driven plates together with ends of drive and driven shafts to which said plates are attached cooperating with said first resilient means to present a sealed interior between the ends of the shafts for communication of the interior of one shaft with the interior of the other.

* * * * *